United States Patent
Vandemoere et al.

(10) Patent No.: US 9,247,477 B2
(45) Date of Patent: Jan. 26, 2016

(54) CALL ROUTING FOR A MULTI-MODE TERMINAL BEING IN A MULTI-MODE COMMUNICATIONS SYSTEM

(75) Inventors: Davy Vandemoere, Watermael-Boitsfort (BE); Guillaume Binet, Watermael-Boitsfort (BE)

(73) Assignee: Mondial Telecom S.A. (BE)

( * ) Notice: Subject to any disclaimer, the term of this patent is extended or adjusted under 35 U.S.C. 154(b) by 0 days.

(21) Appl. No.: 14/112,931

(22) PCT Filed: Apr. 20, 2012

(86) PCT No.: PCT/EP2012/057329
§ 371 (c)(1),
(2), (4) Date: Nov. 24, 2014

(87) PCT Pub. No.: WO2012/143539
PCT Pub. Date: Oct. 26, 2012

(65) Prior Publication Data
US 2015/0111582 A1     Apr. 23, 2015

(30) Foreign Application Priority Data
Apr. 20, 2011 (EP) .................................... 11163303

(51) Int. Cl.
*H04W 76/02* (2009.01)
*H04W 40/02* (2009.01)
(Continued)

(52) U.S. Cl.
CPC .............. *H04W 40/02* (2013.01); *H04W 68/12* (2013.01); *H04W 88/06* (2013.01); *H04W 76/02* (2013.01); *H04W 80/04* (2013.01)

(58) Field of Classification Search
CPC ..... H04W 40/02; H04W 68/12; H04W 88/06; H04W 80/04; H04W 76/02
USPC ............................................. 455/552.1, 41.2
See application file for complete search history.

(56) References Cited

U.S. PATENT DOCUMENTS 7,395,085 B1    7/2008  Mauer et al.
8,244,251 B1 *  8/2012  Bestermann .......... H04W 36/28
                                             370/331
(Continued)

FOREIGN PATENT DOCUMENTS

EP          2114108        11/2009
FI    WO2008110664 A1       9/2008
(Continued)

OTHER PUBLICATIONS

International Search Report and Written Opinion for International Application No. PCT/EP2012/057329, issued Oct. 20, 2013, Applicant, Mondial Telecom. (17 pages).
(Continued)

*Primary Examiner* — George Eng
*Assistant Examiner* — Joseph Dean, Jr.
(74) *Attorney, Agent, or Firm* — Richards Patent Law P.C.

(57) ABSTRACT

Described herein is multi-mode communications system (200) that comprises at least one IP network, at least one mobile communications network, at least one multi-mode terminal (175) connectable to each of said IP network and the mobile telecommunications network, a routing server (120) for routing incoming calls from a caller to a multi-mode terminal (175), and an adaptive location register database (230) for storing at least one record relating to each multi-mode terminal (175). An incoming call (205) is received by the routing server (120). The routing server (120) interrogates an adaptive location register server (220) that is associated with the adaptive location register database (230) to determine current availability for routing the incoming call (205) to the multi-mode terminal (175). The adaptive location register server (220) provides the routing server (120) with data retrieved from the adaptive location register database (230) to indicate which network is more suitable over which the incoming call (205) is to be routed, in accordance with stored subscriber data relating to the multi-mode terminal (175).

1 Claim, 3 Drawing Sheets (51) Int. Cl.
*H04W 68/12* (2009.01)
*H04W 88/06* (2009.01)
*H04W 80/04* (2009.01)

(56) References Cited

U.S. PATENT DOCUMENTS

| | | | |
|---|---|---|---|
| 2003/0169856 A1* | 9/2003 | Elazar | H04M 3/5191 379/67.1 |
| 2007/0037578 A1 | 2/2007 | Besterman | |
| 2008/0137593 A1* | 6/2008 | Laudermilch | H04W 48/02 370/328 |
| 2010/0014495 A1 | 1/2010 | Hirano | |
| 2011/0026468 A1 | 2/2011 | Conrad et al. | |

FOREIGN PATENT DOCUMENTS

| | | |
|---|---|---|
| IL | WO03081877 A2 | 10/2003 |
| SE | WO2004091246 A1 | 10/2004 |

OTHER PUBLICATIONS

Shiao-Li Tsao and E-Cheng Cheng, Reducing Idle Mode Power Consumption of Cellular/VoWLAN Dual Mode Mobiles, Global Telecommunications Conference, 2005. Globecom '05. IEEE St. Louis, MO, USA Nov. 28-Dec. 2, 2005, pp. 2902-2906, vol. 5, USA.

* cited by examiner

CALL ROUTING FOR A MULTI-MODE TERMINAL BEING IN A MULTI-MODE COMMUNICATIONS SYSTEM

The present invention relates to improvements in or relating to location registers, and is more particularly, although not exclusively, concerned with location registers in multi-mode telecommunications systems.

Voice communications have recently known rapid advances in two parallel fields. The first field is that of cellular telephony, which has allowed an increased mobility of telephony users. A second, more recent field is that of Voice-over-Internet-Protocol (VoIP) communications, wherein voice communications are routed over IP networks. While both cellular telephony and VoIP communications have provided undeniable advantages, their parallel development has led also to some drawbacks for a user wishing to exploit both.

Dual mode terminals, independently connectable both to a public switched telephone network (PSTN) and to Internet protocol (IP) networks, have been developed. In particular, such dual mode terminals have been developed that comprise both a mobile telephony transceiver for wirelessly connecting the dual mode terminal to a cellular PSTN, such as, for example, a GSM (Global System for Mobile communications) network or a universal mobile telecommunications system (UMTS) network, and a wireless Local Area Network (LAN) transceiver for connecting to art IP network over a wireless LAN. The existence of such dual mode terminals, coupled to the increasing popularity of VoIP, has led to the emergence of the concept of Fixed-Mobile Convergence (FMC), proposing a single communications system encompassing both a cellular PSTN and an IP network, so that the dual mode terminal can maintain communications with this communication system using either the cellular PSTN or the IP network.

In GSM and UMTS networks forming part of a public land mobile network (PLMN), a subscriber database or home location register (HLR) is provided within the core network which comprises a central database that contains details of each mobile phone subscriber that is authorised to use the GSM core network. For connection to such networks, a mobile operator issues each subscriber with a subscriber identity module (SIM) card which has a unique identifier called an international mobile subscriber identity (IMSI). This IMSI is the primary key to each HLR record. The SIM card allows users to change phones by simply removing the SIM card from one mobile phone and inserting it into another mobile phone or broadband telephony device.

Whilst there can be several logical, and physical, HLRs for each PLMN, only one mobile subscriber integrated services digital network number (MSISDN) exists which forms a unique IMSI/MSIDN pair with the IMSI. Such an IMSI/MSIDN pair can only be associated with only one logical HLR at a time even though the HLR with which the IMSI/MSIDN pair is associated can span several physical nodes. MSISDN is a number uniquely identifying a subscription in a GSM or a UMTS mobile network, and in its simplest terms, comprises the telephone number of the SIM card in a mobile/cellular phone. The MSISDN together with IMSI are two important numbers used for identifying a mobile subscriber. The MSISDN is the number dialed to connect a call the mobile phone and the IMSI identifies the SIM. IMSI is often used as a key in the HLR. A SIM is uniquely associated to an IMSI, while the MSISDN can change in time, for example, due to number portability resulting in different MSISDNs being associated with a SIM.

However, the number of connections over which a subscriber can receive a call is limited due to the link between the IMSI and the SIM. This means that, if a subscriber has several terminals connectable to various networks over which he/she can receive an incoming call, it is not possible to route the call in the most efficient way to the subscriber at the time when the call is received by the routing server.

It is therefore an object of the present invention to provide an adaptive location register for a multi-mode telecommunications system that allows a subscriber to be contacted in the most efficient way on one of a plurality of different mobile terminals depending on his/her location.

In accordance with a first aspect of the present invention, there is provided a multi-mode terminal for use in a multi-mode communications system comprising at least one Internet protocol network and at least one mobile telecommunications network, a routing server, and a database for storing at least one record relating to said multi-mode terminal, said multi-mode terminal being connectable to said at least one internet protocol network and to said mobile telecommunications network, said multi-mode terminal comprising first means for connecting with said database; characterised in that said first means comprises means for automatically updating said at least one of said records in said database in accordance with connections available to said multi-mode terminal since the last update was provided.

By the term "connections" as used here is intended to mean available networks to which the multi-mode terminal could have been connected if required, and includes, but is not limited to, current Wi-Fi networks available in the vicinity of the multi-mode terminal, Wi-Fi networks that were available during the time since the last update, mobile telecommunications networks in the vicinity of the multi-mode terminal, and the location of the multi-mode terminal in terms of access points through or over which an incoming call can be connected.

It is preferred that said multi-mode communications system comprises a mobile-to-mobile convergence platform and said first means for connecting with said database comprises a mobile-to-mobile convergence client application operating on said multi-mode terminal.

Advantageously, the mobile-to-mobile convergence client application further comprises means for receiving messages from said routing server indicating that an incoming call is to be routed to said multi-mode terminal and for connecting said multi-mode terminal to an internet protocol network to receive said incoming call in response to said received messages.

In accordance with another aspect of the present invention, there is provided a multi-mode communications system comprising:

at least one internet protocol network;

at least one mobile telecommunications network;

at least one multi-mode terminal connectable to said at least one internet protocol network and to said mobile telecommunications network;

a routing server for routing incoming calls from a caller to a multi-mode terminal in said multi-mode communications system; and a database for storing at least one record relating to each multi-mode terminal within said multi-mode communications system;

characterised in that said routing server routes incoming calls to said multi-mode terminal over one of said at least one internet protocol network and said mobile telecommunications network in accordance with said at least one record relating to said multi-mode terminal.

Preferably, said multi-mode communications system comprises a mobile-to-mobile convergence platform and said terminal has a mobile-to-mobile convergence client application associated with said mobile-to-mobile convergence platform stored thereon.

In the present invention, said database comprises an adaptive location register database which includes an adaptive location register, said adaptive location register providing updates for said at least one record stored in said adaptive location database relating to said multi-mode terminal in accordance with data provided by said multi-mode terminal.

In one embodiment, said mobile-to-mobile client application on said multi-mode terminal updates said at least one record in accordance with connections available to said multi-mode terminal since the last update was provided.

In accordance with a further aspect of the present invention, there is provided a method of routing an incoming call to a multi-mode terminal in a multi-mode communications system, comprising a multi-mode network including at least one Internet protocol network and at least one mobile telecommunications network, said multi-mode terminal being connectable to said at least one internet protocol network and to said mobile telecommunications network, the method comprising the steps of:

a) maintaining records relating to said multi-mode terminal;

b) receiving an incoming call for said multi-mode terminal through said multi-mode communications system; and c) routing said incoming call in accordance with the maintained records;

characterised in that step a) comprises determining connections available to said multi-mode terminal, providing data relating to said connections, and updating said records for said multi-mode terminal in accordance with said data.

Advantageously, step c) comprises determining a preferred network over which the incoming call is to be routed in accordance with the maintained records.

Ideally, the method further comprises:

d) trying to establish a link to said multi-mode terminal via the preferred network; and e) connecting the incoming call to said multi-mode terminal once the link has been established.

Step d) may comprise using a contact timeout determined in accordance with at least one of said maintained records. The incoming call to the multi-mode terminal may be routed via another network in the multi-mode communications system, once the contact timeout has been exceeded.

In one embodiment, said preferred network comprises an internet protocol network.

For a better understanding of the present invention, reference will now be made, by way of example only, to the accompanying drawings in which.

The present invention will be described with respect to particular embodiments and with reference to certain drawings but the invention is not limited thereto. The drawings described are only schematic and are non-limiting. In the drawings, the size of some of the elements may be exaggerated and not drawn on scale for illustrative purposes.

Switched circuit telephone networks use a signalling protocol called Common Channel Signalling System #7 (more commonly called SS7 or C7). In the public switched telephone network (PSTN), signalling end points send and receive SS7 signalling messages. There are three kinds of signalling end points: Service Switch Point (SSP or central office switch); Signal Transfer Point (STP); Service Control Point (SCP).

In SS7 networks, Integrated Services Digital Network (ISDN) User Part (ISUP), signalling messages are used to setup, manage and release trunk circuits that carry voice calls between central office switches. ISUP messages also carry caller identification (ID) information, such as, telephone number and name of a calling party. ISUP is used for both ISDN and non-ISDN calls between central office switches.

Transaction Capabilities Application Part (TCAP) signalling messages support telephony services, such as toll-free (freephone), calling card, local number portability and mobile (wireless) roaming and authentication services. Mobile services are enabled by information carried in the Mobile Application Part (MAP) of a TCAP message. TCAP supports non-circuit related information exchange between signalling points using the Signalling Connection Control Part (SCCP) connectionless service.

Voice over Internet Protocol (VoIP) networks carry SS7-over-IP using protocols defined by Signalling Transport (SigTran) working group of the Internet Engineering Task Force (IETF), the international organisation responsible for recommending Internet standards. The SigTran protocols support the stringent requirements for SS7/C7 signalling as defined by International Telecommunication Union.

In IP telephony networks, signalling information is exchanged between the following functional elements: the media gateway (MG), the media gateway controller (MGC), and the signalling gateway.

The media gateway terminates voice calls on inter-switch trunks from the public switched telephone network, compresses and packetizes the voice data, and delivers compressed voice packets to the IP network. For voice calls originating in an IP network, the media gateway performs these functions in reverse order. For ISDN calls from the PSTN, Q.931 signalling information is transported from the media gateway to the media gateway controller for call processing.

The media gateway controller handles the registration and management of resources at the media gateway(s) and exchanges ISUP messages with central office switches via a signalling gateway. Because vendors of media gateway controllers often use off-the-shelf computer platforms, a media gateway controller is sometimes called a "softswitch".

The signalling gateway provides transparent interworking of signalling between switched circuit and IP networks and may terminate SS7 signalling or translate and relay messages over an IP network to a media gateway controller or another signalling gateway. Because of its critical role in integrated voice networks, signalling gateways are often deployed in groups of two or more to ensure high availability.

Media gateways, signalling gateways or media gateway controllers ("softswitch") may be separate physical devices or integrated in any combination.

The current trend in mobile telecommunications is towards multi-mode communications systems in which multiple networks are available to which a subscriber can connect for voice calls. The implementation of mobile-to-mobile convergence (MMC) architecture in a multi-mode communications system provides improved accessibility to multiple networks for a subscriber. Such an implementation comprises a MMC platform in the multi-mode communications system and a MMC client in the dual mode terminal of the subscriber.

The term "subscriber" as used herein relates to a user that subscribes to a multi-mode communications service, for example, a service that includes MMC. It will be appreciated that the term "user" also applies to a user of the multi-mode communications system and not only a subscriber to such a system, for example, the subscriber may be a parent and the user may be another family member.

MMC is an offshoot of FMC in which a dual mode terminal operates with specialised software and hardware for connecting voice calls and other applications via a voice-over-WLAN (VoWLAN) and/or through a cellular service. WLAN is used to route calls via the internet and uses a wireless carrier network if the WLAN is not present. It differs from FMC in that a ranking is put on the connections with WLAN being the primary connection and the wireless carrier network as the secondary connection.

It will be appreciated that the present invention is not limited to WLAN and can be 3G, EDGE or any other IP network. The term Wi-Fi as used herein relates to connection to any suitable IP network including 3G, EDGE, VoWLAN etc.

Although the present invention is described with reference to a dual mode terminal connectable to a GSM or IP network, it will be appreciated that the terminal may be connectable to more than two types of networks and can therefore comprise a multi-mode terminal. In addition, the term "mobile terminal" as used herein is used to cover dual mode as well as multi-mode terminals.

Figure 1:
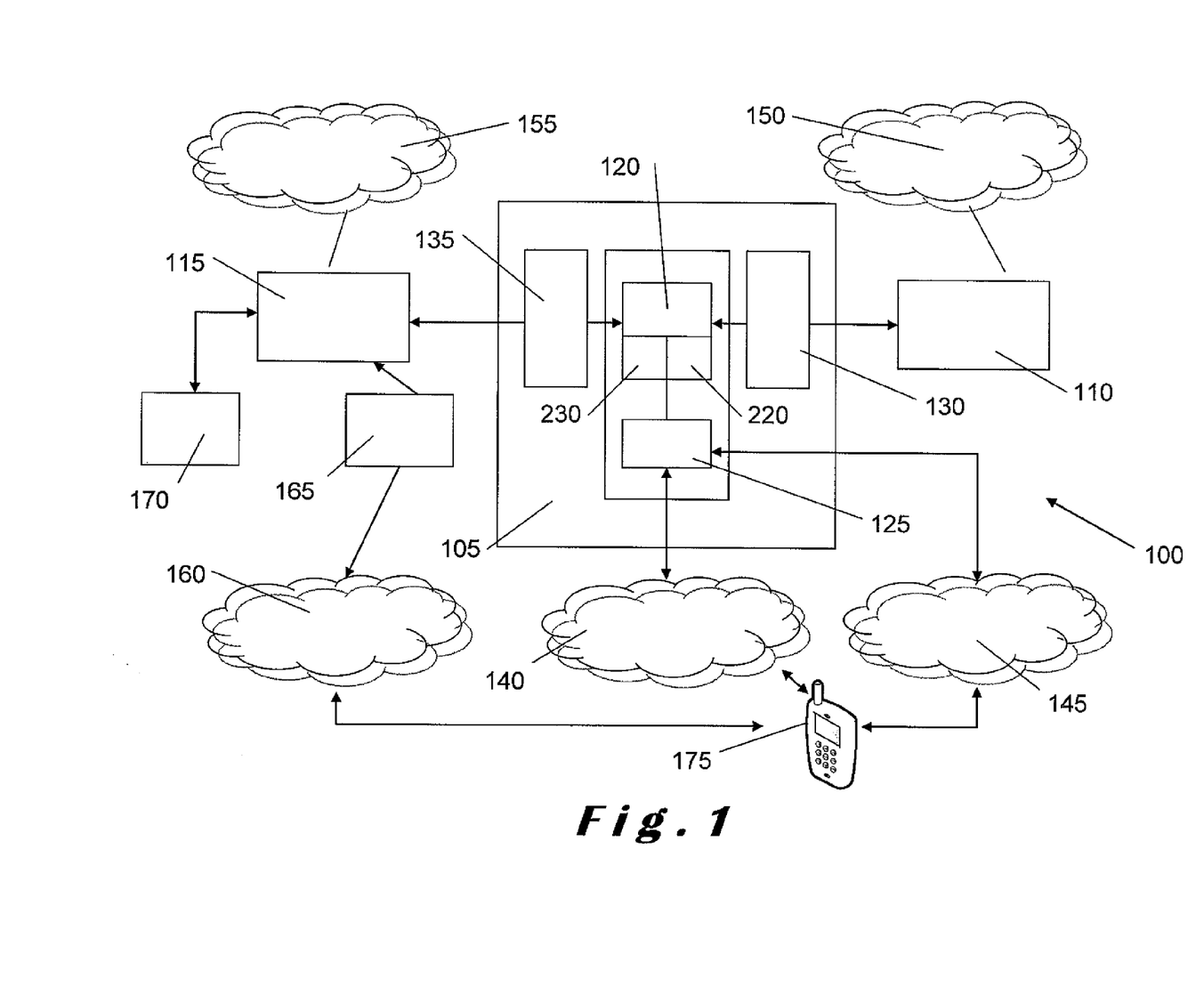
FIG. 1 illustrates a MMC-based communications system in accordance with the present invention.

FIG. 1 illustrates a block diagram of a multi-mode communications system 100 in accordance with the present invention. The system 100 comprises a MMC platform 105, a fixed network 110, and a mobile switching centre (MSC)/home location register (HLR) server 115. The MMC platform 105 comprises a signal initiation protocol (SIP) core 120 connected to MMC voice call continuity (VCC) and voice quality control (VQC) server 125. First and second MGs 130, 135 are provided through which connections to the fixed network 110 and MSC/HLR server 115 are made from the SIP core 120. The MMC VCC and VQC server 125 is connectable to a public Wi-Fi zone (public zone) 140 and controlled Wi-Fi zone (hotspots) 145.

In addition, the SIP core 120 includes an adaptive location register (ALR) server 220 and an ALR database 230. Operation of the ALR server 220 and the ALR database 230 will be described in more detail with respect to FIG. 2.

The fixed network 110 is connected to a first PSTN 150 and the MSC/HLR server 115 is connected to a second PSTN 155. The first and second PSTNs 150, 155 may be connectable to one another or, in one embodiment, may be the same PSTN. The MSC/HLR server 115 is also connected to a mobile radio access network (RAN) 160 via a mobile MSC/HLR server 165. The MSC/HLR server 115 is also connected to a mobile voicemail system 170.

A dual mode terminal 175 is connectable to the public zone 140, hotspots 145 and the mobile RAN 160. The dual mode terminal 175, for example, a smart phone handset, has a MMC client application that controls the network connection so that the priority is given to Wi-Fi connections via the Wi-Fi zones, namely, the public zone 140 and hotspots 145, with the mobile RAN 160 only being used when it is not possible to make a Wi-Fi connection, either due to a lack of availability or insufficient voice call quality over the Wi-Fi connection.

The MMC platform 105 supports the highest possible voice call quality on the most appropriate network in accordance with availability. There are two main elements of the architecture 105, namely, a MMC platform corresponding to the SIP core 120, the ALR server 220, the ALR database 230, and the MMC VCC and VQC server 125, and a MMC client (not shown) that is provided on the dual mode terminal 175.

In addition to the SIM, IMSI and MSISDN data mentioned above, the HLR directly receives and processes MAP transactions and messages from elements in the GSM network, for example, a location update as messages are received as the dual mode terminal roams, namely, moves onto a network operated by another mobile network operator (MNO). The HLR also stores data relating to:

(i) GSM services to which the subscriber has access;
(ii) General packet radio services (GPRS) settings to allow the subscriber to access packet services;
(iii) Location information relating to the subscriber using a visitor location register (VLR) and a service GPRS support node (SGSN);
(iv) Call divert settings associated with each MSISDN.

The VLR is a database of subscribers that have roamed into the jurisdiction of the MSC which it serves. Each base station in the network is served by only one VLR and therefore a subscriber can only be present in one VLR at a time. The data that is stored in the VLR can be received from the HLR or from the base station with which it is associated. The VLR may be integrated with the MSC or is closely linked via a proprietary interface. When a MSC detects a new mobile terminal in its network, it creates a new record in the VLR and updates the HLR of the mobile subscriber so that the HLR knows where the mobile subscriber is located.

A SGSN is responsible for the delivery of data packets to and from mobile terminals within its geographical service area. Its tasks include packet routing and transfer, mobility management (attach/detach and location management), logical link management, and, authentication and charging functions. The location register of the SGSN stores location information including the current cell, current VLR and user profiles (IMSI, addresses used in the packet data network) of all GPRS users registered with the SGSN.

The HLR initially assumes that the GSM network is in the exact status as it was when the mobile terminal was last active when connected to the GSM network. However, in MMC, it is necessary to know where the mobile terminal is at any time so that the connections via IP networks can be established in preference to connections via GSM networks. This is particularly important as a connection to the IP network can be lost due to impaired quality and/or may be disconnected to increase battery efficiency of the mobile terminal. As a result, it is necessary to be able to determine the status of the mobile terminal of a subscriber and his/her devices to which connections can be made for receiving incoming voice calls. SIP to determine the location of the mobile terminal of the subscriber. The first of these methods necessitates keeping track of the exact SIP uniform resource identifier (URI), that is, the IP address and port on which the mobile terminal can be reached and for how long the mobile terminal can be reached on that particular IP address and port. This is done by the mobile terminal of the subscriber, which sends an update of its location every 'X' seconds, where 'X' is determined in accordance with the communications system to which the mobile terminal is connected. The second method only provides "presence" information relating to the user, for example, "busy", "on holiday" etc., and not the IP addresses on which a call can be routed to a mobile terminal.

The URI specifies where an identified resource is available and a mechanism for retrieving that resource. This is termed uniform resource locator (URL) in computing applications.

SIP was initially designed with the view that the mobile terminal is connected to the IP network using a reliable method, for example, cables. In MMC, the second method, providing only "presence" information, is unreliable. In order to counter this, the client device, such as, a mobile terminal, needs to register frequently with the communications system so that its state can, easily and readily, be determined. This means that the mobile terminal can be determined as being either online or offline. However, there is a disadvantage that the battery of the mobile terminal becomes drained and does not provide a true indication of the status of the mobile terminal. Moreover, whilst it is possible to determine if the SIP stack is registered on the server, it is not possible to determine if the mobile terminal in the vicinity of a Wi-Fi connection.

Whilst Wi-Fi connections are battery efficient for data transfer, they are not battery efficient for providing updates to the MMC platform indicating the status of the MMC client on the mobile terminal. However, GSM is battery efficient for providing status updates.

In accordance with the present invention, an additional register, an adaptive location register (ALR), is provided. The ALR sits above the HLR and a SIP register associated with the SIP server in the multi-mode communications system. The ALR communicates with the SIP register but not with the HLR. The ALR enables an incoming call to be routed correctly as will be described in more detail below. The use of the ALR allows status changes of the mobile terminal to be determined and stored so that it is possible to connect a call to the user in the most efficient way possible. In MMC, this would preferably be via a Wi-Fi or IP network connection.

A single contact number is used, namely, the MSISDN, to contact the user via a Wi-Fi network, if available, or via a mobile telecommunications network if Wi-Fi is not available.

With the ALR, it is possible to store data relating to the normal routine of the user via updates provided by the MMC client on the mobile terminal, and, therefore the probability of being able to contact him/her using a particular network in accordance with his/her preferences. Preferences may be determined by the subscriber in accordance with his/her particular requirements from the system and available packages provided by the service provider. In addition, preferences may also be determined by the service provider in accordance with service availability. For example, a user may register his position with the ALR using an enhanced data for global evolution (EDGE) connection to indicate that he/she is in a Wi-Fi zone to which he/she can be connected but to which he/she is not currently connected in order to save battery power. The term "user" as used here relates to a subscriber to network services having a MMC platform as described above as well as to the mobile terminal, having the MMC client application, of the user or subscriber.

EDGE is an upgrade for GSM and general radio packet service (GRPS) and increases data rates. EDGE is used automatically when both the mobile terminal and the network to which it is connected support it, with the mobile terminal reverting to the slower GPRS standard when EDGE is not available.

GRPS is used for various data applications on mobile phones including wireless internet via wireless application protocol (WAP), multimedia messaging service (MMS) and software that connects to the internet. In particular, any network connection that is not voice or text messaging uses a data connection like GRPS.

The user also reports to the network to which he/she is connected his/her position information. This gives the ALR an indication of the reliability of this information over time. For example, if a user reported in via a particular network a minute ago, the ALR may determine that the possibility that the user is still connected to the same network is higher than if the user had changed networks. In addition, a user may report some short term historical data, for example, that he/she has made a connection to a new Wi-Fi network and reports that other Wi-Fi networks were also available in the vicinity. Over time, this provides an indication of the behaviour of the user from which a database can be established. Whilst "reporting in" is optional for the user, it will have an impact on the network which is used by the multi-mode communications system to route an incoming call to the user.

In response to this information, the ALR can provide information to a trusted server, for example, a SIP server that has receives an incoming call and needs to know where to direct the call. This is illustrated in FIG. 2.

Figure 2:
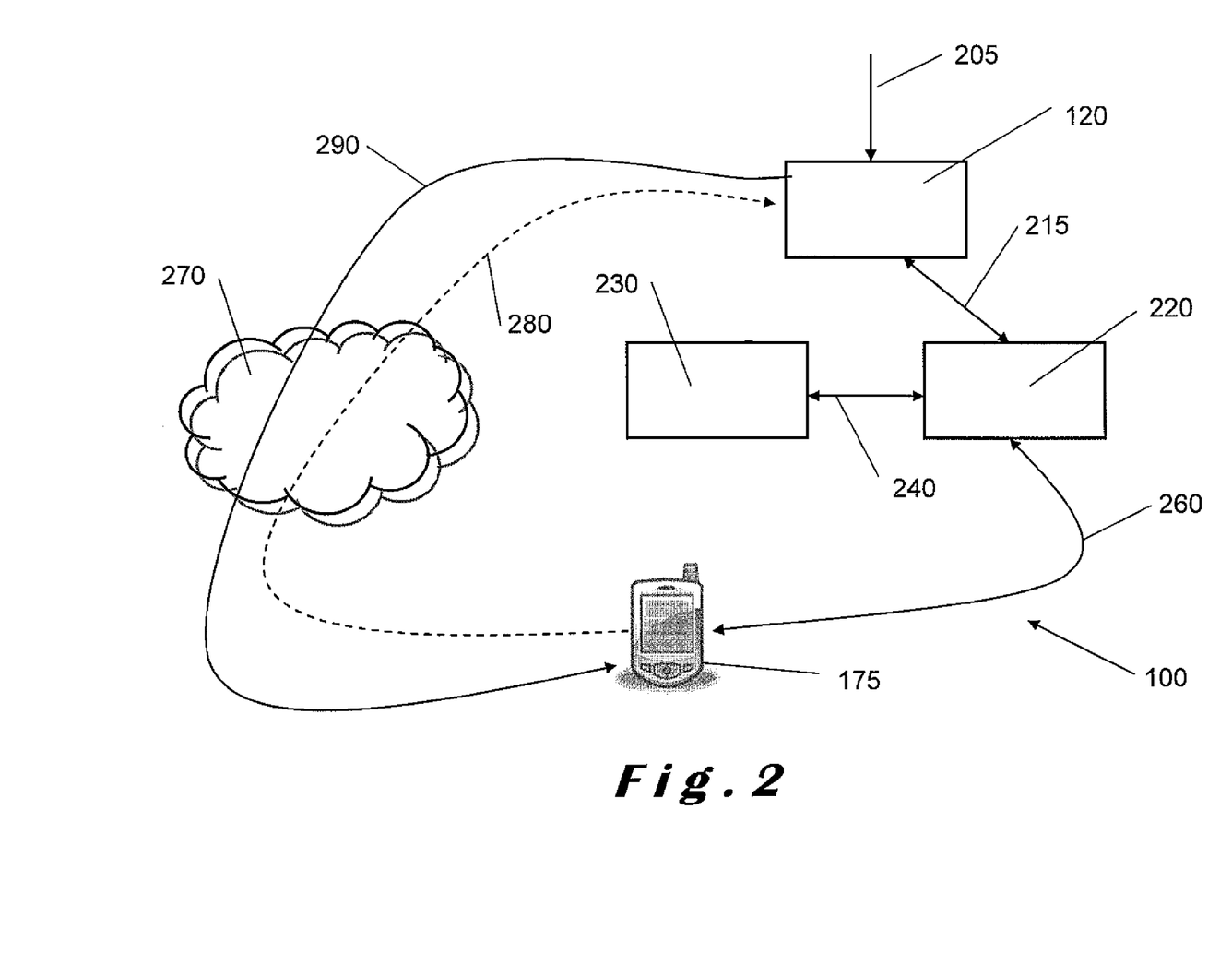
FIG. 2 illustrates a block diagram of the MMC-based communications system of FIG. 1 and the use of an adaptive location register in accordance with the present invention.

In FIG. 2, a MMC-based communications system 100 utilising an ALR server and database is shown. The SIP server 120 is connected to the ALR server 220 which is also connected to the ALR database 230 via connection 240. Mobile terminal 175 is connected to the ALR server 220 via a network channel 260 so that it can provide updates. A multi-mode communications system 270 is also shown which comprises at least one IP network and at least one mobile telecommunications network (not shown individually).

As shown by connection 240, the ALR server 220 provides information for the ALR database 230, as well as, receives information from the ALR database 230 for forwarding to the SIP server 120. In the ALR database 230, information relating to the subscriber is stored, for example, preferences, locations, network environment, etc. Updates to this information are transmitted by the ALR server 220 to the ALR database 230 via the connection 240 to update the stored data in the ALR database 230 relating to that particular mobile terminal 175. This information is collected from the ALR server 220 using signalling between the ALR server 220 and the mobile terminal 175 via the network channel 260.

If a subscriber has more than one mobile terminal, these terminals will also provide updates to the ALR server 220 via associated network channels and the stored data relating to these terminals will also be updated in the ALR database 230.

As shown the connection 215 between the SIP server 120 and the ALR server 220 operates in both directions, that is, the SIP server 120 can interrogate the ALR server 220 as well as being able to receive information stored in the ALR database 230 via the ALR server 220.

When an incoming call 205 is received by the SIP server 120, the SIP server 120 interrogates the ALR server 220 for information relating to the mobile terminal 175 to which the incoming call is to be routed in accordance with its MSISDN. The ALR server 220 retrieves status information from the ALR database 230 which it then transmits to the SIP server 120. This status information may include the location of the mobile terminal 175, its status (active or inactive), to which networks it can be connected etc. Using this status information, the ALR server 220 provides the SIP server 120 with a probability that the mobile terminal 175 can be connected over a particular network, preferably, over an IP network using a Wi-Fi connection. However, the ALR server 220 will also provide information relating to other available networks, for example, GSM or EDGE. If the mobile terminal 175 is not connected to an IP network, the ALR server 220 also provides information relating to the number of attempts that the SIP server 120 should make when trying to connect to the mobile terminal 175 over an IP network in the multi-mode communications system 270 as described in more detail below.

Once a location has been determined for the dual mode terminal 175, the most suitable network is selected for connecting the call in accordance with the information stored in the ALR database 230. In MMC, the preferred network is an IP network using a Wi-Fi connection, but this will depend on the location of the mobile terminal 175 and the preferences that are stored in the ALR database 230. The SIP server 120 tries a predetermined number of times, in accordance with the number of attempts stored in the ALR database 230 as described above, to connect the incoming call 205 with the dual mode terminal 175 using the preferred IP network in the multi-mode communications system 270. However, the SIP server 120 will only try to connect the incoming call 205 with the mobile terminal 175 if it has access to a Wi-Fi connection but is not already connected via Wi-Fi.

In an attempt to connect the incoming call 205 to the mobile terminal 175 via an IP network in the multi-mode communications system 270, the SIP server 210 tries to contact the dual mode terminal 175 via the IP network. At the same time, the ALR server 220 signals the dual mode terminal 175 over the network channel 260 to let it know that an incoming call is waiting to be routed and that the mobile terminal 175 needs to make a Wi-Fi connection to take the incoming call 205.

The timing of how long the SIP server 120 should try to connect via Wi-Fi is variable and is based on environmental factors, including, but not limited to, the last report of the user, the type of data connection of the user (EDGE, 3G, high-speed downlink packet access (HSDPA), GSM, Wi-Fi etc.), available networks for the user, connected networks for the user, preferences of the user, and preferences of the supplier of network services to the user.

If the mobile makes a Wi-Fi connection, it notifies the SIP server 120 via connection 280 and the incoming call 205 is routed via an IP network in the multi-mode communications system 270 to the mobile terminal 175 using SIP as indicated by connection 290. The user of the mobile terminal 175 has the option of either taking the call or declining the call as is the usual case with any incoming call.

If more than one Wi-Fi connection is possible, the Wi-Fi connection is made in accordance with the signal strength of the available Wi-Fi connections.

If the dual mode terminal has not made a Wi-Fi connection after the predetermined number of attempts, the incoming call is then routed via a GSM or other mobile telecommunications network associated with the multi-mode communications system 270 to the mobile terminal 175. It may be possible to handover from the GSM or other mobile telecommunications network to a Wi-Fi connection during the call in accordance with the infrastructure of the MMC platform.

In one embodiment, where a subscriber has more than one mobile terminal registered with the service provider, the SIP server may try to contact each mobile terminal simultaneously when trying to route an incoming call. Depending on the physical location of each mobile terminal in relation to the subscriber when the call is being routed, the subscriber may have a choice of terminals on which to take the call, for example, the subscriber may be at home or in the office with his/her smart phone, tablet, laptop etc., and the SIP server may try to connect to each of these devices as they have the same MSISDN associated with the subscriber when trying to establish the call.

The ALR server 220 can also provide information indicating the position of the mobile terminal 175 and for how long a period of time the terminal has been at that location. If it is known that the connection is via EDGE and the mobile terminal 175 is on the move, then it is pointless trying to contact the mobile terminal 175 using SIP and a connection via EDGE or other mobile telecommunications network would be more suitable. Global positioning system (GPS) or other location systems may also be used to provide external location data that indicates position and movement of the dual mode terminal 175.

In accordance with the present invention, update of the ALR server 220 and its associated ALR database 230 is initiated by the MMC client on the mobile terminal 175. As described above, the mobile terminal 175 does not stay connected via Wi-Fi as it drains the battery of the terminal. The MMC client activates and maintains Wi-Fi connections in accordance with subscriber preferences. For example, if an outgoing call has been made over a Wi-Fi connection, the connection may remain active for a predetermined period after the outgoing call has been terminated, for example, for 15 minutes. It will be appreciated that this period is variable and is determined in accordance with the subscriber package.

In one embodiment, when the dual mode terminal is connected to another application, for example, his webmail application, the MMC client may use that connection to "piggy back" data for updating the ALR server 220 and its associated ALR database 230. The data used for updating the ALR database generally relates to available network connections available to the mobile terminal 175 since the last time it provided an update for the ALR server 220. Available network connections may include: current Wi-Fi networks available in the vicinity of the mobile terminal; Wi-Fi networks that were available during the time since the last update; available mobile telecommunications networks in the vicinity; status of the dual mode terminal; its location, for example, in terms of available access points through which an incoming call can be made; battery status; the time of day, etc. The update received by the ALR server 220 is transferred to the ALR database 230 to update records relating to the particular mobile terminal 175. The update enables the ALR server 220 to provide a better indication of the probability of being able to connect to the mobile terminal via a Wi-Fi connection for the SIP server 120 when it receives an incoming call 205 for directing to the mobile terminal 175.

From the updates provided by the MMC client in the mobile terminal 175, the ALR server 220 and its associated ALR database 230 can establish and store patterns of behaviour for the user, for example, where the user is at different times of day and days of the week in terms of physical locations, available networks over which calls can be connected, etc. This increases the probability that the user can be connected with an incoming call through a Wi-Fi connection.

Figure 3:
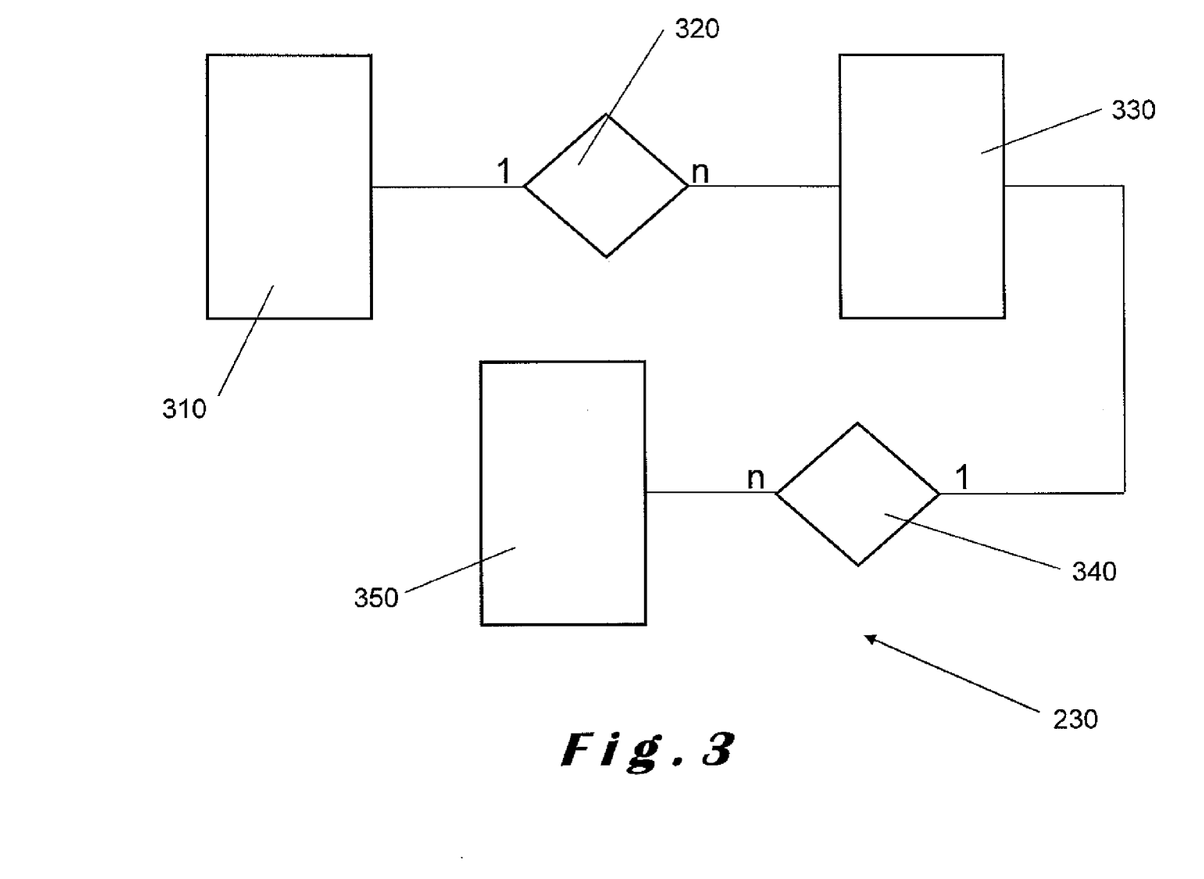
FIG. 3 illustrates an entity relationship diagram of a database associated with or forming part of an adaptive location register in accordance with the present invention.

Although in FIG. 2, a single mobile terminal is shown, it will be appreciated that a user may have different terminals, for example, smart phone, tablet, laptop, home phone etc. on which he/she can receive an incoming call. In FIG. 3, an entity relationship diagram of the ALR database 230 is shown in more detail. The ALR database 230 comprises user information register 310 that includes subscriber preferences as described above. The user information register 310 is connected to an end point register 330 via a multiplier connection 320 where each piece of user information stored in the user information register 310 can be connected to one of a plurality of entries in the end point register 330. Examples of such end points that can be stored in the end point register 330 include multi-mode devices or mobile terminals covered by the user subscription as well as possible locations for a user and the multi-mode devices covered by the subscription. The end point register 330 is linked, via another multiplier connection 340, to a plurality of links stored in a link register 350. Examples of such links include connectivity of each device or networks in terms of the multi-mode communications system with which the devices operate.

It will be appreciated that, for each entry in the user information register 310, that entry can be associated with one of a plurality of end point entries in the end point register 330, and, that each end point entry can be associated with a plurality of link entries in the link register 350. This means that, for each user or subscriber, information relating to all possible mobile terminals and networks are linked.

It will also be appreciated that although the ALR server 220 is shown as being a separate device to the ALR database 230, it will be appreciated that the ALR server 220 and the ALR database 230 may be consolidated to form a single element without departing from the present invention. In addition, multiple ALR servers may be associated with a single ALR database, multiple ALR databases may be associated with a single ALR server, multiple ALR databases may be associated with multiple ALR servers, and multiple SIP servers may be associated with one ALR server.

It will be appreciated that the present invention is not limited to the specific embodiments described above, but may encompass alternatives and/or additions.

The invention claimed is:

1. A method of routing an incoming call to a multi-mode terminal in a multi-mode communications system comprising a multi-mode network including at least one internet protocol network and at least one mobile telecommunications network, said multi-mode terminal being connectable to said at least one internet protocol network and to said mobile telecommunications network, the method comprising the steps of:

a) maintaining records relating to said multi-mode terminal using at least data provided by said multi-mode terminal;

b) receiving an incoming call for said multi-mode terminal through said multi-mode communications system; and c) routing said incoming call in accordance with the maintained records;

d) trying to establish a link to said multi-mode terminal via the preferred network; and e) connecting the incoming call to said multi-mode terminal once the link has been established;

wherein step a) comprises determining connections available to said multi-mode terminal, providing data relating to said connections, and updating said records for said multi-mode terminal in accordance with said data;

wherein step c) comprises determining a preferred network over which the incoming call is to be routed in accordance with the maintained records;

wherein step d) comprises using a contact timeout determined in accordance with at least one of said maintained records; and further comprising routing the incoming call to the multi-mode terminal via another network in the multi-mode communications system once the contact timeout has been exceeded.

* * * * *